United States Patent
Jiao et al.

(10) Patent No.: US 12,275,102 B2
(45) Date of Patent: Apr. 15, 2025

(54) WELD LINE DATA GENERATION DEVICE, WELDING SYSTEM, WELD LINE DATA GENERATION METHOD, AND COMPUTER READABLE MEDIUM

(71) Applicant: Kobe Steel, Ltd., Kobe (JP)

(72) Inventors: Youzhuo Jiao, Kanagawa (JP); Kenji Sadahiro, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 816 days.

(21) Appl. No.: 17/433,783

(22) PCT Filed: Feb. 4, 2020

(86) PCT No.: PCT/JP2020/004196
§ 371 (c)(1),
(2) Date: Aug. 25, 2021

(87) PCT Pub. No.: WO2020/175041
PCT Pub. Date: Sep. 3, 2020

(65) Prior Publication Data
US 2022/0134464 A1    May 5, 2022

(30) Foreign Application Priority Data
Feb. 26, 2019  (JP) ................................ 2019-032635

(51) Int. Cl.
*B23K 9/127* (2006.01)
*B23K 9/095* (2006.01)
(Continued)

(52) U.S. Cl.
CPC ............ *B23K 9/127* (2013.01); *B23K 9/0953* (2013.01); *B25J 9/163* (2013.01); *B25J 9/1664* (2013.01); *B25J 11/005* (2013.01)

(58) Field of Classification Search
CPC .... B23K 9/127; B23K 26/70; B23K 26/0884; B23K 26/24; B23K 9/10; B25J 9/163; B25J 9/1664
See application file for complete search history.

(56) References Cited

U.S. PATENT DOCUMENTS

| 6,292,715 B1 * | 9/2001 | Rongo ................... B25J 9/1671 700/165 |
| 2012/0029674 A1 * | 2/2012 | Hida ..................... B23K 9/127 700/98 |

FOREIGN PATENT DOCUMENTS

| CN | 104070266 A | 10/2014 |
| JP | 2010-184278 A | 8/2010 |

* cited by examiner

*Primary Examiner* — Thien S Tran
(74) *Attorney, Agent, or Firm* — Oblon, McClelland, Maier & Neustadt, L.L.P.

(57) ABSTRACT

A weld line data generation device generates weld line data specifying a portion to be welded by a welding robot. The weld line data generation device includes: a recording unit in which possibility information indicating possibility of welding by the welding robot is recorded for each combination of configuration names of members; an extraction unit configured to extract a combination of two or more adjacent members from three-dimensional data of a structure to be manufactured by welding; and a generation unit configured to generate, when a combination of configuration names corresponding to the extracted combination of two or (Continued)

more members is weldable, the weld line data specifying a portion to be welded between the two or more members corresponding to the combination.

12 Claims, 7 Drawing Sheets

(51) Int. Cl.
*B25J 9/16* (2006.01)
*B25J 11/00* (2006.01)

| | MEMBER 1 | MEMBER 2 | MEMBER 3 | MEMBER 4 | MEMBER 5 | MEMBER 6 | MEMBER 7 | OTHERS |
|---|---|---|---|---|---|---|---|---|
| MEMBER 1 | | × | | | | | | × |
| MEMBER 2 | | | × | ○ | × | × | × | × |
| MEMBER 3 | | | | × | ○ | ○ | × | × |
| MEMBER 4 | | | | | ○ | ○ | × | × |
| MEMBER 5 | | | | | | × | × | × |
| MEMBER 6 | | | | | | | × | × |
| MEMBER 7 | | | | | | | | × |
| OTHERS | | | | | | | | |

○ : WELDABLE
× : NON-WELDABLE

WELD LINE DATA GENERATION DEVICE, WELDING SYSTEM, WELD LINE DATA GENERATION METHOD, AND COMPUTER READABLE MEDIUM

TECHNICAL FIELD

The present invention relates to a weld line data generation device, a welding system, a weld line data generation method, and a computer readable medium storing a program.

BACKGROUND ART

Nowadays, welding robots have been used in many fields, and automation of welding work has been advanced. In welding by the welding robot, it is necessary to determine a welding path (or a weld line) of an entire structure to be welded and set the welding path in the welding robot in advance. Patent Literature 1 describes a technique for speeding up selection of a weld line by an operator.

CITATION LIST

Patent Literature

Patent Literature 1: JP-A-2010-184278

SUMMARY OF INVENTION

Technical Problem

However, in order to specify a weld line by the technique described in Patent Literature 1, an operator needs to manually designate each surface, which requires manual work. A technique of automatically specifying a weld line is also partially widespread, but it is necessary to perform a process of determining whether to make a weld line by a brute force on each surface, and it takes a very long time to specify the weld line.

An object of the present invention is to make it possible to efficiently and automatically specify a portion to be welded or a candidate thereof by a welding robot.

Solution to Problem

For the object, as an invention there is provided a weld line data generation device that generates weld line data specifying a portion to be welded by a welding robot, the weld line data generation device including: a recording unit in which possibility information indicating possibility of welding by the welding robot is recorded for each combination of configuration names of members; an extraction unit configured to extract a combination of two or more adjacent members from three-dimensional data of a structure to be manufactured by welding; and a generation unit configured to generate, when a combination of configuration names corresponding to the extracted combination of two or more members is weldable, the weld line data specifying a portion to be welded between the two or more members corresponding to the combination.

The weld line data generation device may further include a configuration name specifying unit configured to specify a configuration name of each member constituting the structure based on both or one of a shape of each member constituting the three-dimensional data and a positional relationship between members.

The configuration name specifying unit here may specify a member that does not require welding by the welding robot as a non-welded member, and, when one of the extracted combination of members is the non-welded member, the generation unit may exclude the combination from a welding target.

Further, the configuration name specifying unit may specify a configuration name of a member having a plate-like shape based on an area of a member constituting the three-dimensional data.

In addition, information on the shape of the member may include information on a shape of a groove.

Further, the configuration name specifying unit may specify a configuration name of a member adjacent to another member whose configuration name is specified based on a positional relationship with the another member.

Further, the configuration name specifying unit may calculate, as a positional relationship between the two extracted members, at least one value of an inclination angle, a rotation angle, and a twist angle of the other member with respect to the one member, and may specify the other member as a non-welded member when the calculated value is equal to or greater than a threshold value, and, when one member of the extracted combination of adjacent members is the non-welded member, the generation unit may exclude the combination from the welding target.

Further the configuration name specifying unit here may specify the configuration name of each member constituting the structure using a learned model that has learned a relationship between the configuration name of the member and both or one of the shape of a member and the positional relationship between members.

In addition, the generation unit may further determine, when the two extracted members are weldable, whether there is a groove at a portion where the two members are adjacent to each other, and may generate, in a case where there is a groove, the weld line data according to information on a shape of the groove.

Further, as a different invention, there is provided a welding system, including: a welding robot configured to weld members to each other; a welding control device configured to control an operation of the welding robot based on weld line data; a recording unit in which possibility information indicating possibility of welding by the welding robot is recorded for each combination of configuration names of members; an extraction unit configured to extract a combination of two or more adjacent members from three-dimensional data of a structure to be manufactured by welding; and a generation unit configured to generate, when a combination of configuration names corresponding to the extracted combination of two or more members is weldable, the weld line data specifying a portion to be welded between the two or more members corresponding to the combination.

Further, as a different invention, there is provided a weld line data generation method for generating weld line data specifying a portion to be welded by a welding robot, including: a process of extracting a combination of two or more adjacent members from three-dimensional data of a structure to be manufactured by welding; a process of determining whether welding of a combination of configuration names corresponding to the extracted combination of two or more members is possible by referring to possibility information for each combination of configuration names prepared in advance; and a process of generating, when a combination of configuration names corresponding to the extracted combination of two or more members is weldable, the weld line data specifying a portion to be welded between the two or more members corresponding to the combination.

Further, as a different invention, there is provided a non-transitory computer readable medium storing a program for causing a computer to execute: a process of extracting a combination of two or more adjacent members from three-dimensional data of a structure to be manufactured by welding; a process of determining whether welding of a combination of configuration names corresponding to the extracted combination of two or more members is possible by referring to possibility information for each combination of configuration names prepared in advance; and a process of generating, when a combination of configuration names corresponding to the extracted combination of two or more members is weldable, the weld line data specifying a portion to be welded between the two or more members corresponding to the combination.

Advantageous Effects of Invention

According to the present invention, it is possible to efficiently and automatically specify a portion or a candidate thereof at which a welding robot is to weld.

DESCRIPTION OF EMBODIMENTS

Hereinafter, examples of embodiments of a welding power supply, a welding system, a method for controlling a welding power supply, and a program according to the present invention are described with reference to the accompanying drawings. It should be noted that the drawings are prepared for the description of the present invention, and the embodiments of the present invention are not limited to the contents shown in the drawings.
<Overall Configuration of System>

Figure 1:
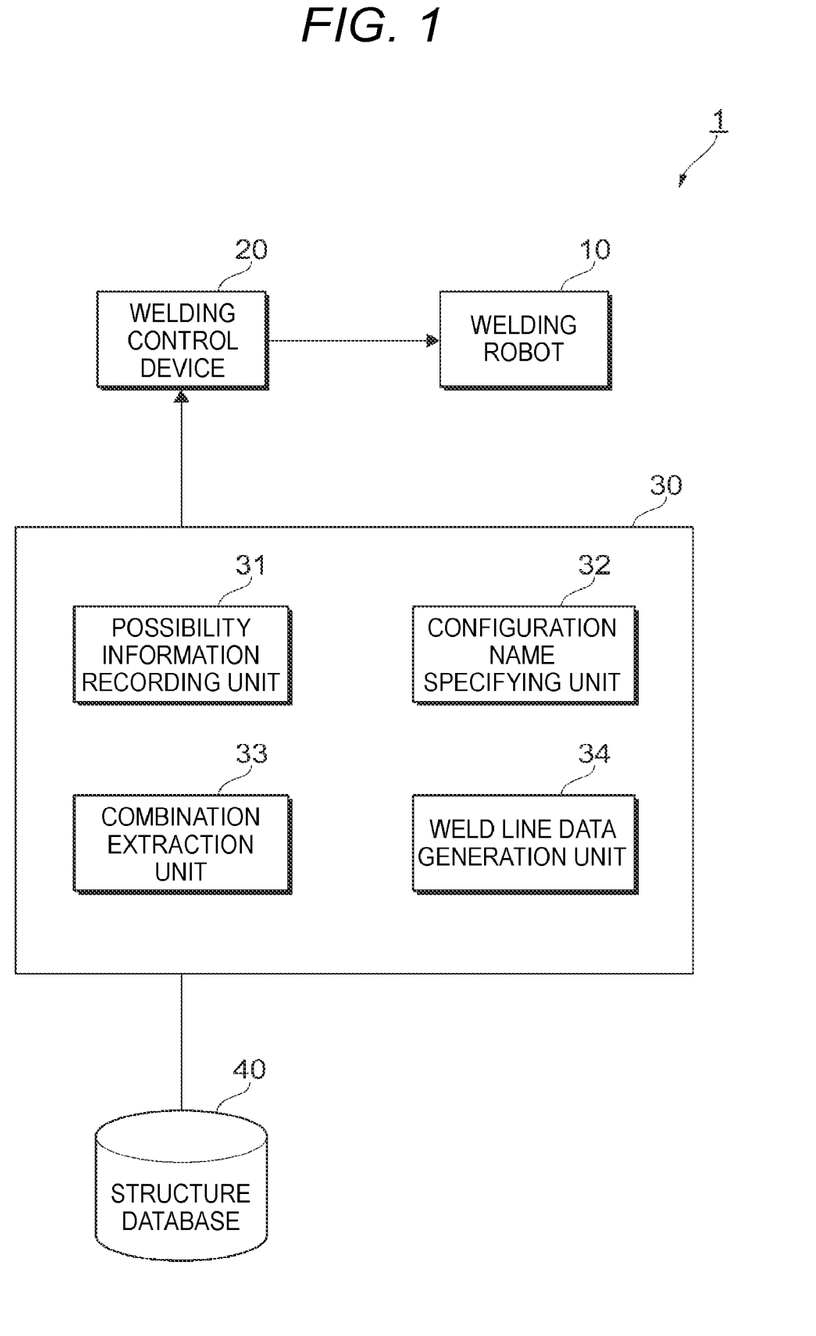
FIG. 1 is a diagram showing a configuration example of a welding system according to an embodiment.

FIG. 1 is a diagram showing a configuration example of a welding system 1 according to an embodiment.

A welding system 1 shown in FIG. 1 includes a welding robot 10 that welds members to be welded to each other, a welding control device 20 that controls a movement of the welding robot 10, a weld line data generation device 30 that gives, to the welding control device 20, weld line data for giving a welding position, and a structure database 40 that stores three-dimensional data describing a shape of each member constituting a structure manufactured by welding, a positional relationship between the members, and the like.

There are various types of welding robots 10 depending on applications. For example, there are an iron frame welding robot used for welding an iron frame, a building component welding robot, a bridge welding robot, a carriage component welding robot, a forklift component welding robot, and a welding robot for a ship field.

In the present embodiment, the iron frame welding robot is assumed as the welding robot 10.

The welding control device 20 includes, for example, a computer, and controls a movement of one or a plurality of welding robots 10.

The computer includes a calculation unit that executes a control program, a nonvolatile semiconductor memory that stores an activation program and the like, a volatile semiconductor memory that executes the control program, a hard disk device that stores operation parameters collected from the welding robot 10 and weld line data that designates a portion to be welded, and the like.

An input device such as a keyboard or a touch panel, and a display device that displays information on progress of welding are also connected to the welding control device 20 as a computer.

The weld line data in the present embodiment refers to a set of data defining a portion to be welded (weld line) of two or more members adjacent to each other.

An adjacent relationship includes, for example, a relationship in which a certain member and another member are in contact with each other, a relationship in which there is a gap between a certain member and another member, and a relationship in which another member cuts into a certain member. In the case of the present embodiment, the gap refers to a space which has a predetermined distance or less and to which members can be connected by welding.

The weld line data generation device 30 also includes, for example, a computer. Here, the computer includes a calculation unit that executes an application program, a nonvolatile semiconductor memory that stores a activation program and the like, a volatile semiconductor memory in which the application program is executed, a hard disk device that records data including the application program and weld line data, an input device, a display device, and the like.

In the hard disk device according to the present embodiment, information indicating possibility of welding (hereinafter, referred to as "welding possibility information") is also recorded for each combination of configuration names of members. In the present embodiment, a region portion of the hard disk device in which welding possibility information is recorded is referred to as a possibility information recording unit 31. The possibility information recording unit 31 is an example of a recording unit.

In the present embodiment, the hard disk device is exemplified as a recording device for the application program or the like, but a device that reads and writes data from and to a semiconductor memory or another recording medium may be used. The hard disk device may be a device built in the weld line data generation device 30 or an external device.

In FIG. 1, the welding control device 20 and the weld line data generation device 30 are illustrated as independent devices, but some or all of the functions of the weld line data generation device 30 may be included in the welding control device 20.

In the case of the present embodiment, the weld line data generation device 30 is connected to the welding control device 20 via a communication line or a network. Here, the network is, for example, a local area network (LAN) or the Internet (including a cloud network).

However, a role of the weld line data generation device 30 is to generate weld line data necessary for welding, and the connection between the weld line data generation device 30 and the welding control device 20 is not essential. For example, when the weld line data generation device 30 and the welding control device 20 are not connected by a communication line or the like, the weld line data generated by the weld line data generation device 30 may be written to the welding control device 20 using a portable recording medium.

The weld line data generation device 30 implements a function of efficiently and automatically specifying a weld line or a candidate of the weld line through execution of the application program by the calculation unit. In FIG. 1, three elements of the function of efficiently and automatically specifying a weld line or a candidate of the weld line among the functions executed by the weld line data generation device 30 include a configuration name specifying unit 32, a combination extraction unit 33, and a weld line data generation unit 34.

In the present embodiment, the configuration name specifying unit 32 is prepared in order to assume a case where the configuration name is not given to each member on three-dimensional computer-aided design (CAD) data. By providing the configuration name specifying unit 32, even when the configuration name is not given to each member, it is possible to specify the weld line or the candidate of the weld line using the combination extraction unit 33 and the weld line data generation unit 34. When the configuration name is already given to each member on three-dimensional CAD data (hereinafter, also referred to as "three-dimensional data"), the configuration name specifying unit 32 is unnecessary or the execution of the provided configuration name specifying unit 32 is stopped.

The configuration name specifying unit 32 is a functional unit that reads information related to the shape of each member constituting the structure, the positional relationship between the members, and the like from the three-dimensional data recorded in the structure database 40, and automatically specifies the configuration name of each member constituting the structure. A method used for specifying the configuration name may be different depending on the structure.

In the case of the present embodiment, the configuration name specifying unit 32 first specifies a configuration name of a member having a characteristic in shape such as an area, and subsequently specifies a configuration name of another member based on a positional relationship with respect to the member for which the configuration name is specified. It should be noted that a condition to be satisfied by the corresponding member is given to the configuration name in advance.

In the present embodiment, "others" is used as a configuration name of members that do not satisfy a predetermined condition. A member that does not require welding (hereinafter referred to as "non-welded member") is also classified as "others".

The configuration name specifying unit 32 also uses, as the positional relationship between two members, at least one or more values of an inclination angle, a rotation angle, and a twist angle of the other member with respect to one member. When the values of the inclination angle, the rotation angle, and the twist angle calculated based on the three-dimensional data are equal to or greater than a threshold value, the configuration name specifying unit 32 in the present embodiment classifies the other member as the non-welded member. By including the information such as the inclination angle in the positional relationship, accuracy of specifying the configuration name is improved.

In the present embodiment, a member having a relatively large area is referred to as "one member", and a member having a relatively small area is referred to as "the other member". By using an area that can be compared objectively, the positional relationship between the members becomes clear, and the accuracy of specifying the configuration name of the member is increased. In a relationship between a member whose configuration name is already specified and a member whose configuration name is not specified, the member whose configuration name is already specified is referred to as "one member", and the member whose configuration name is not specified is referred to as "the other member". When one configuration name is specified, the accuracy of specifying the configuration name of the other member is increased.

Figure 2:
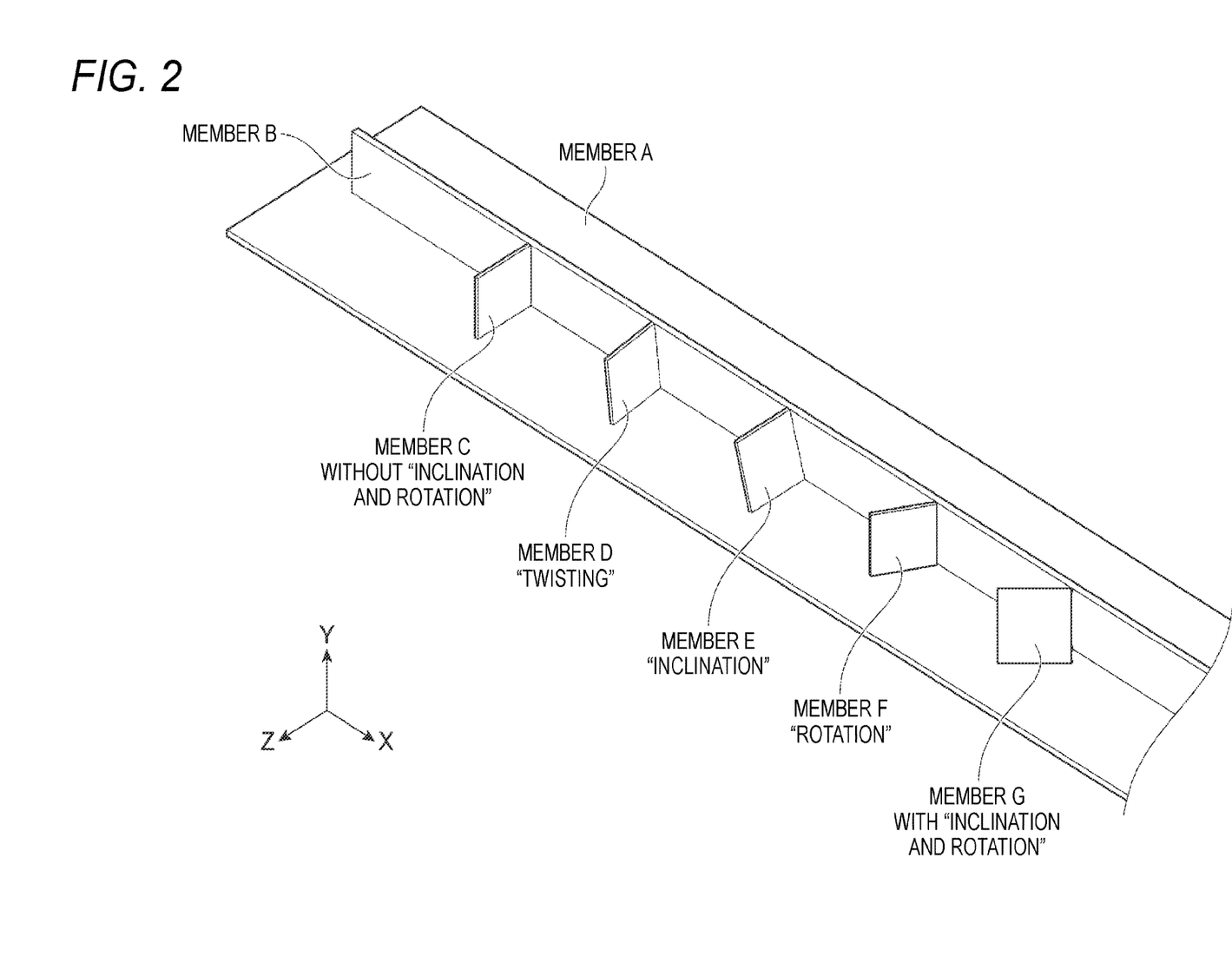
FIG. 2 is a diagram showing positional relationships such as inclination, rotation, and twisting.

FIG. 2 is a diagram illustrating the positional relationships such as inclination, rotation, and twisting.

FIG. 2 shows a positional relationship of members C to G with respect to a structure defined by a flat plate-like member A having the largest area and a flat plate-like member B having a second largest area. The largest surface of the member A is parallel to an XZ plane, and the largest surface of the member B is parallel to an XY plane. That is, the member A and the member B are perpendicular to each other. The member B is attached to the member A so as to extend in an X axis direction.

In the drawing, the member C represents a positional relationship in which there is neither inclination nor rotation. In the case of FIG. 2, the largest surface of the member C is parallel to an YZ plane. Therefore, the member C is perpendicular to both the member A and the member B.

The member D refers to a positional relationship in which the member D is rotated about a normal axis (here, X axis) of the largest surface thereof. The positional relationship is referred to as "twisting".

The member E refers to a positional relationship in which the member E is rotated about a side (here, Z axis) in contact with the member A. In this case, the member E is perpendicular to only the member B. The positional relationship is referred to as "inclination".

The member F refers to a positional relationship in which the member F is rotated about a side (here, Y axis) in contact with the member B. In this case, the member F is only perpendicular to the member A. The positional relationship is referred to as "rotation".

The member G refers to a positional relationship including both inclination and rotation.

Note that a learned model learned by a method such as deep learning may be used to specify the configuration name of each member. Here, the learned model may be a general-purpose model that learns a relationship among the shape of members, the positional relationship between the members and the configuration names, or may be a dedicated model that the relationship among the shape of members, the positional relationship between the members and configuration names for each application.

When the learned model is used, the configuration name specifying unit 32 obtains the configuration name of each member by giving three-dimensional data corresponding to the structure to be manufactured to the learned model.

When the learned model is generated, the relationship between the shape of the member and the configuration name may be learned, or the relationship between the positional relationship between the members and the configuration name may be learned.

When the learned model is used, an evaluation result of an operator or the like with respect to an output result may be given as a reward (so-called Q value), and the learned model may be corrected.

By using the learned model, it is possible to efficiently specify the configuration name of each member.

The description returns to FIG. 1.

The combination extraction unit 33 is a functional unit that reads the positional relationship between the members constituting the structure from the three-dimensional data recorded in the structure database 40, and automatically extracts a combination of two or more members adjacent to each other. Here, the combination extraction unit 33 is an example of an extraction unit.

For example, when three-dimensional data of the structure shown in FIG. 2 is given, the combination extraction unit 33 extracts a combination of the member A, the member B, and the member C, a combination of the member A, the member B, and the member D, a combination of the member A, the member B, and the member E, a combination of the member A, the member B, and the member F, and a combination of the member A, the member B, and the member G. It is noted that, in any combination, it is assumed that each value of the calculated inclination angle, rotation angle, and twist angle is less than the threshold value.

In the case of FIG. 2, the member D is located next to the member C in an X axis direction. For this reason, the combination of the member C and the member D can also be considered to be adjacent to each other in a broad sense.

In the present embodiment, when a distance between the members exceeds a predetermined minimum distance, the combination of the members is excluded from the combination of two or more members adjacent to each other.

Here, the minimum distance is equal to or less than a predetermined distance at which the members can be connected by welding described above.

For example, when the member has a flat plate shape, the minimum distance may be determined for each member based on an area and thickness of the largest surface, or may be uniformly determined based on a distance at which welding can be performed.

Under the above conditions, the member C and the member D are excluded from the combination of two or more members adjacent to each other.

The weld line data generation unit 34 is a functional unit that executes a function of determining, for each of the combinations of two or more members extracted by the combination extraction unit 33, whether a combination of the configuration names of the members constituting the combination is registered as weldable, and a function of specifying a portion to be welded between two or more members corresponding to the combination and outputting the portion as the weld line data when the combination is weldable.

Here, information recorded in the possibility information recording unit 31 is used for the determination of whether welding is possible. The weld line data generation unit 34 is an example of a generation unit.

Figure 3:
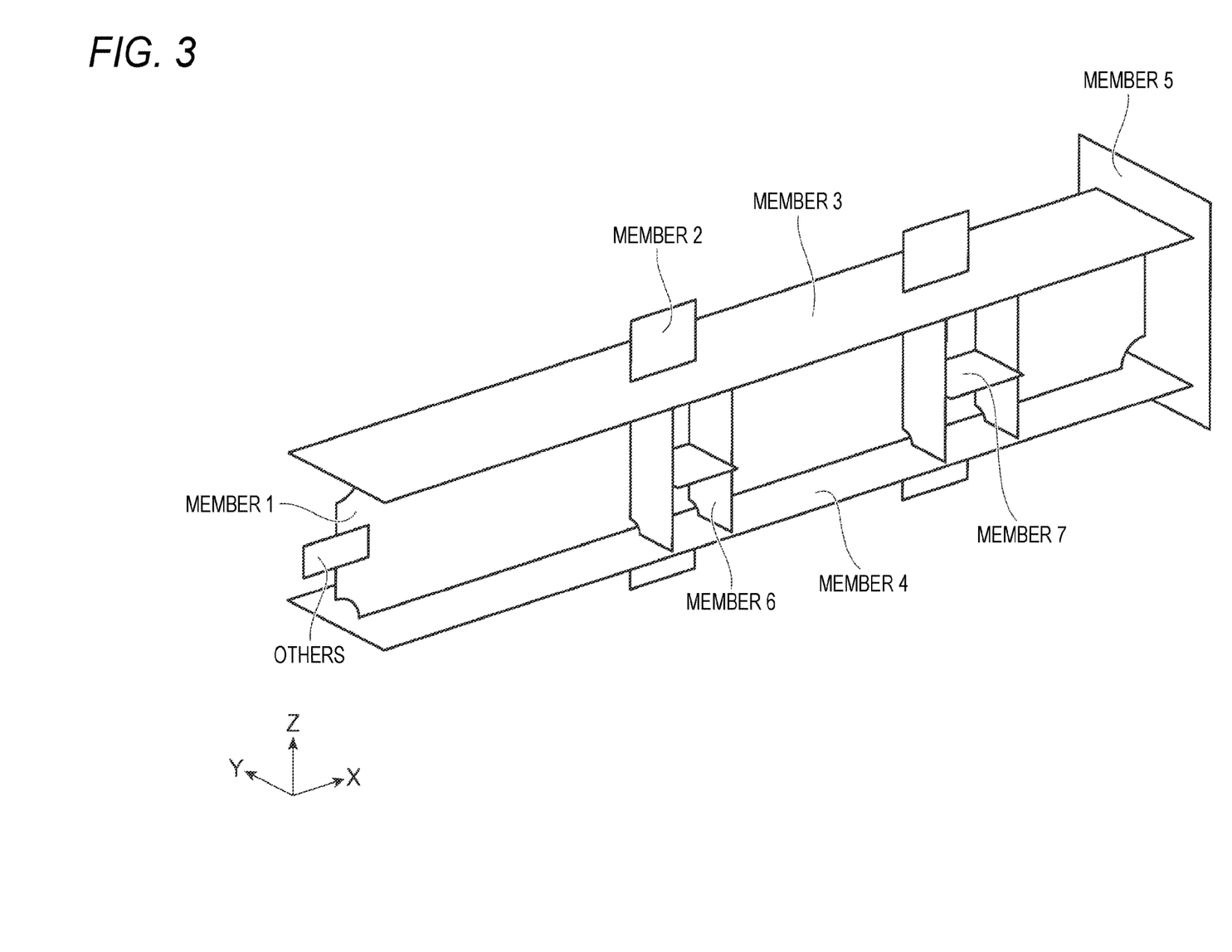
FIG. 3 is a diagram showing a structure and members that are components of the structure.

FIG. 3 is a diagram illustrating a structure and members that are components of the structure.

The structure shown in FIG. 3 has a configuration in which a plurality of members are attached to H-shaped steel arranged in an I-shape in the YZ plane. In the drawings, "member 1" to "member 7" and "others" represent names (that is, member names) of the respective members in the present embodiment.

In the case of FIG. 3, the H-shaped steel includes three flat plate portions of the "member 1", the "member 3", and the "member 4". In the present embodiment, not only in the case where the H-shaped steel is manufactured by welding three flat plate-like members, but also in the case where the H-shaped steel is integrally manufactured by rolling, the respective portions are distinguished and referred to as the "member 1", the "member 3", and the "member 4".

The "member 2", the "member 6", and the "member 7" are names of reinforcing members used to prevent deformation of the H-shaped steel. The "member 5" is a name of a member attached to an end portion of the H-shaped member, and is used for coupling with a member (not shown).

Note that "others" is assembly name of members that cannot be specified as the "member 1" to the "member 7". A member corresponding to the "non-welded member" described above is also included in "others".

Figure 4:
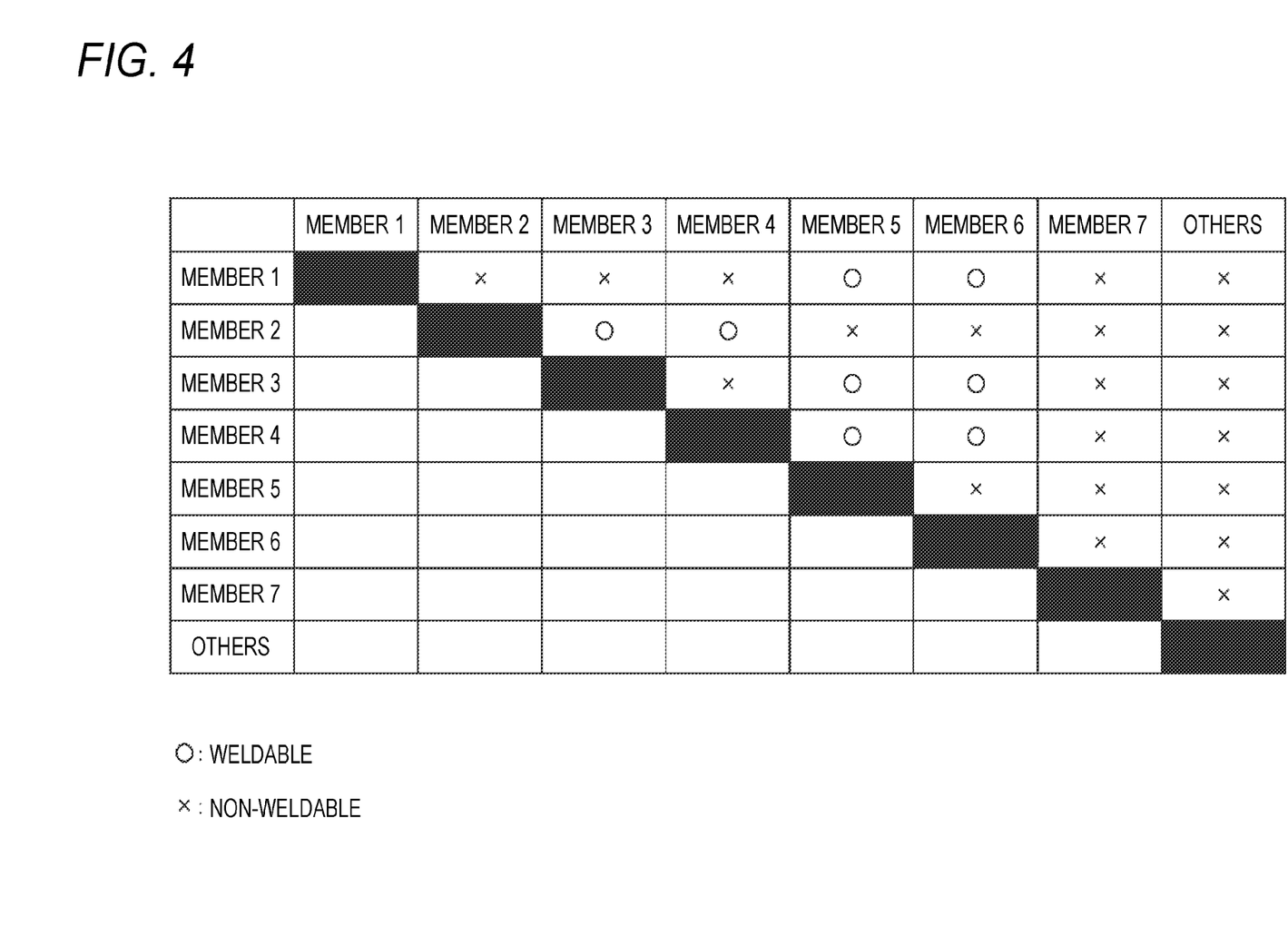
FIG. 4 is a diagram showing a structure example of welding possibility information recorded in a possibility information recording unit.

FIG. 4 is a diagram showing a structure example of the welding possibility information recorded in the possibility information recording unit 31 (see FIG. 1).

The welding possibility information has a structure in which information indicating welding possibility or the like by the welding robot 10 (see FIG. 1) is recorded for each combination of different members.

In the case of FIG. 4, the information indicating welding possibility includes two types of information, that is, weldable (○ in the drawing) and non-weldable (× in the drawing).

The "member 1" to the "member 7" and "others" shown in FIG. 4 correspond to the "member 1" to the "member 7" and "others" in FIG. 3.

In the case of the member 1, the names of the weldable members are the "member 5" and the "member 6".

The description returns to FIG. 1.

The weld line data generation unit 34 has a function of determining whether the combination of the member names constituting the individual combinations extracted by the combination extraction unit 33 includes a combination of weldable (○ in FIG. 4). The determination here is based on the relationship between the two members.

For example, when the extracted one combination includes three members, the weld line data generation unit 34 decomposes the one combination to be determined into a combination of two members, and determines whether welding is possible for each of the plurality of combinations obtained by the decomposition.

Here, when one of the extracted combination of members is a non-welded member (that is, "others"), the combination is excluded from a welding target. By removing a portion that is not welded in advance, it is possible to efficiently specify the weld line or the candidate of the weld line.

When a combination of weldable member names is included, the weld line data generation unit 34 specifies a portion where a plurality of members are in contact with each other or a portion where a gap between members is less than a weldable distance based on the three-dimensional data, and registers the specified portion as the weld line or the candidate of the weld line.

When there is a groove in a part of one member of the weldable combination, the weld line data generation unit 34 specifies a portion to be the candidate of the weld line according to groove shape information. In the present embodiment, the portion where a groove is provided is specified as the weld line or the candidate of the weld line.

Therefore, the weld line data generation unit 34 according to the present embodiment is provided with a function of determining the presence or absence of a groove.

Figure 5:
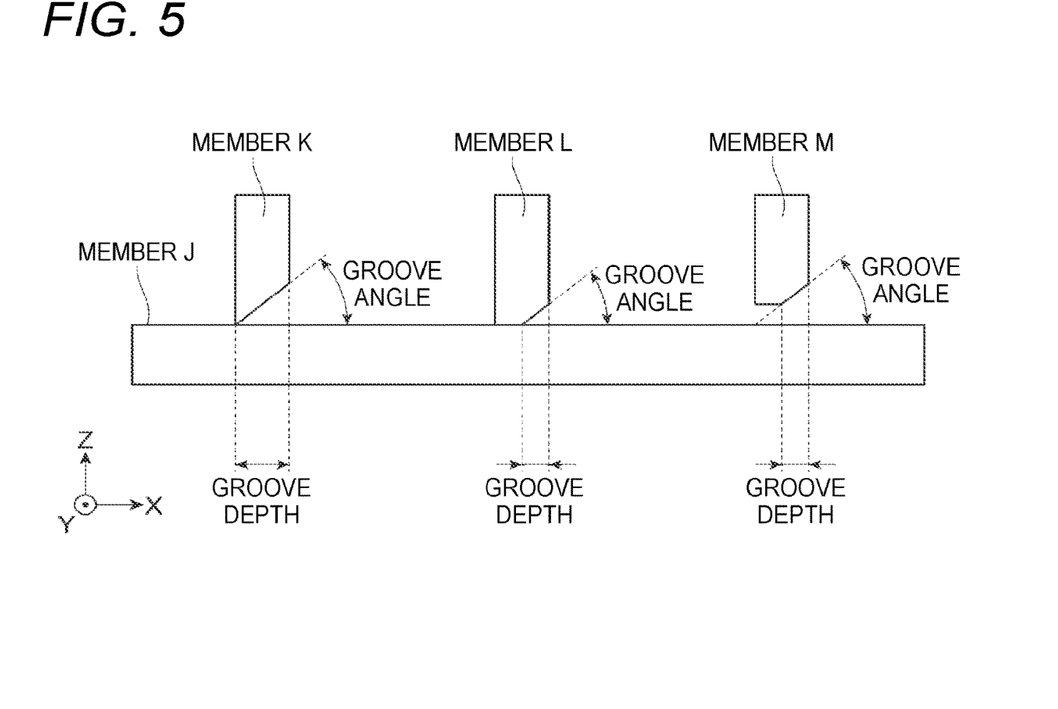
FIG. 5 is a diagram showing an example of a relationship between members determined to have a groove.
Figure 6:
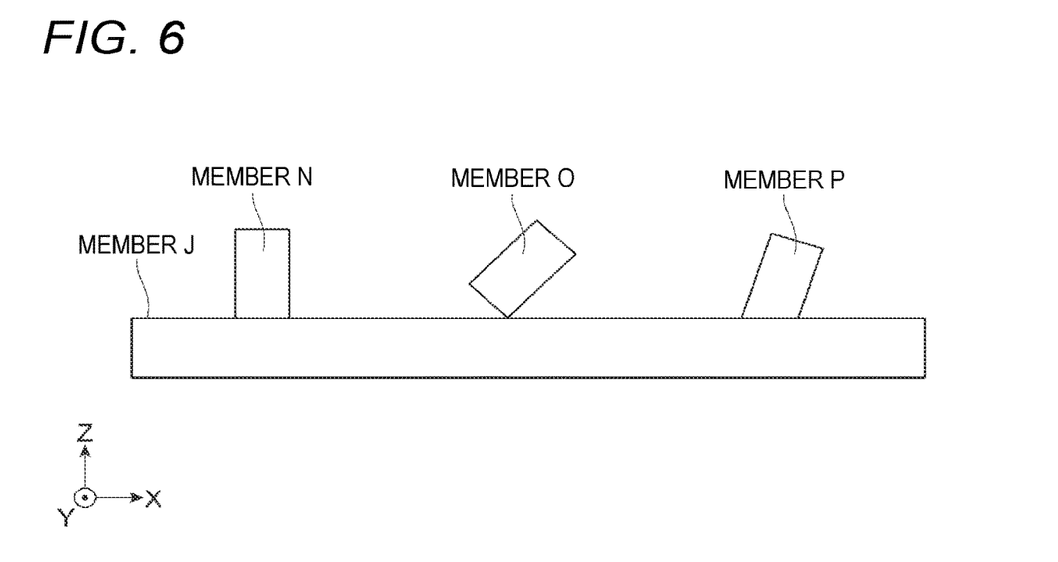
FIG. 6 is a diagram showing an example of a relationship between members determined to have no groove.

FIG. 5 is a diagram showing an example of a relationship between members determined to have a groove. FIG. 6 is a diagram showing an example of a relationship between members determined to have no groove.

FIG. 5 shows three examples that are considered to have a groove.

In the case of the member K, an entire surface adjacent to the member J is processed into an inclined surface. In this case, an angle formed by the inclined surfaces of the member J and the member K is a groove angle. A groove depth is given by a length of the inclined surface of the member K in the X axis direction.

In the case of the member L, a part of a surface adjacent to the member J is processed into an inclined surface, and the remaining surface is in contact with the member J. In this case, an angle formed by inclined surface portions of the member J and the member L is the groove angle. A groove depth is given by a length of the inclined surface portion of the member L in the X axis direction.

The member M has the same shape as the member L, but a gap is formed between the member M and the member L. In this case, an angle formed by an extension line of the inclined surface portion of the member M and the member J is the groove angle. A groove depth is given by a length of the inclined surface portion of the member M in the X axis direction.

A shape of the groove is not limited to a shape shown in FIG. 5, and may be a K shape, an I shape, a V shape, a J shape, an X shape, a U shape, a double-sided J shape, a double-sided U shape, or the like.

FIG. 6 shows three examples in which there is no groove.

A relationship between the member N and the member J is called a T-joint, and the rectangular member N and the member J form a T-shape. In this case, it is determined that the member N has no groove.

A relationship between the member O and the member J is called a natural groove, and the member J is in contact with a corner of the rectangular member O. A triangular gap is formed between the member O and the member J in the XZ plane. The triangular gap is generated due to an attachment relationship, and is not treated as a groove.

A relationship between the member P and the member J is called a full groove. The member P has the same shape as the member K (see FIG. 5), but since the entire inclined surface is in contact with the surface of the member J, the member P is not treated as a groove similarly to the member N. By using the presence or absence of the groove, it is possible to increase the accuracy of specifying the weld line or the portion to be the candidate of the weld line as well as the accuracy of specifying the configuration name.

<Processing Operation of Weld Line Data Generation Device>

Figure 7:
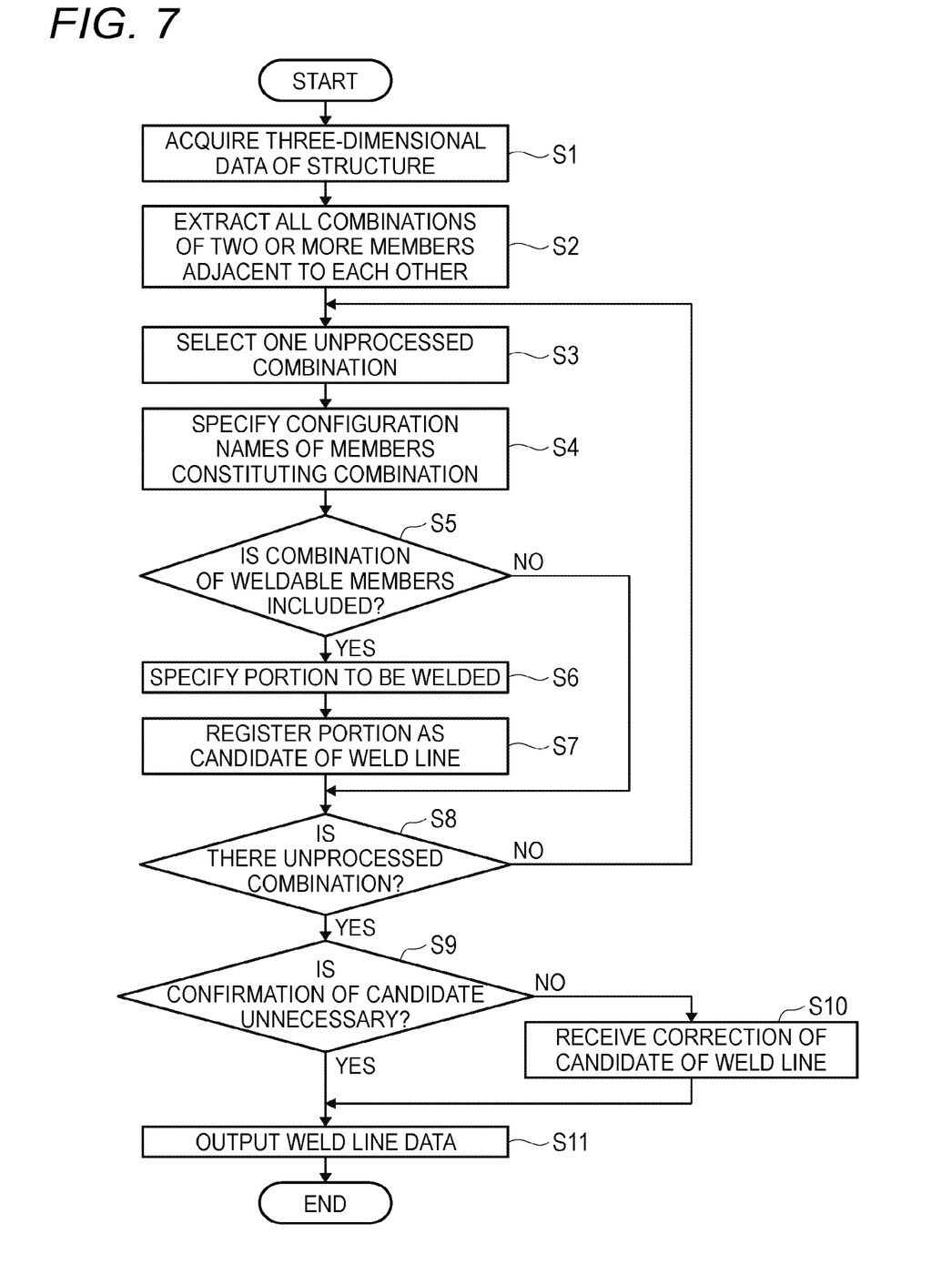
FIG. 7 is a flowchart showing a processing operation executed by a weld line data generation device.

FIG. 7 is a flowchart showing a processing operation executed by the weld line data generation device 30 (see FIG. 1). A procedure shown in FIG. 7 is an example of a weld line data generation method. A symbol S in the drawing indicates a step.

First, the weld line data generation device 30 acquires the three-dimensional data of a structure manufactured by welding from the structure database 40 (see FIG. 1) (step 1). The three-dimensional data to be taken in is designated by the operator through, for example, an operation screen (not shown).

Next, the weld line data generation device 30 extracts all combinations of two or more members adjacent to each other (step 2). The processing operation is executed by the combination extraction unit 33 (see FIG. 1).

When the extraction from the three-dimensional data is completed, the weld line data generation device 30 selects one unprocessed combination from all the extracted combinations (step 3).

Next, the weld line data generation device 30 specifies the configuration names of the plurality of members constituting the selected combination (step 4). The configuration name of the member at each position constituting the structure is specified by the configuration name specifying unit 32 (see FIG. 1).

When the configuration names of the members constituting the selected combination are specified, the weld line data generation device 30 determines whether the combination of weldable members is included by referring to the welding possibility information (step 5). The processing operation is executed by the weld line data generation unit 34 (see FIG. 1).

When a positive result is obtained in step 5, the weld line data generation device 30 specifies a portion to be welded between the weldable members (step 6), and registers the portion as the candidate of the weld line (step 7).

Thereafter, the weld line data generation device 30 determines whether there is an unprocessed combination (step 8).

When a negative result is obtained in step 5, the weld line data generation device 30 performs the determination in step 8 without performing steps 6 and 7.

When a negative result is obtained in step 8, the weld line data generation device 30 returns to step 3, and executes a series of processes described above for the newly selected one combination.

When a positive result is obtained in step 8, the weld line data generation device 30 determines whether the confirmation of the candidate is unnecessary (step 9). Although the determination process is not essential, in the present embodiment, it is possible to select whether an operator confirms automatically registered candidates of the weld line.

When a positive result is obtained in step 9 (that is, when confirmation is unnecessary), the weld line data generation device 30 outputs all automatically registered candidates of the weld line as the weld line data (step 11).

On the other hand, when a negative result is obtained in step 9 (that is, when confirmation by the operator is performed), the weld line data generation device 30 receives correction of the candidate of the weld line (step 10).

Figure 8:
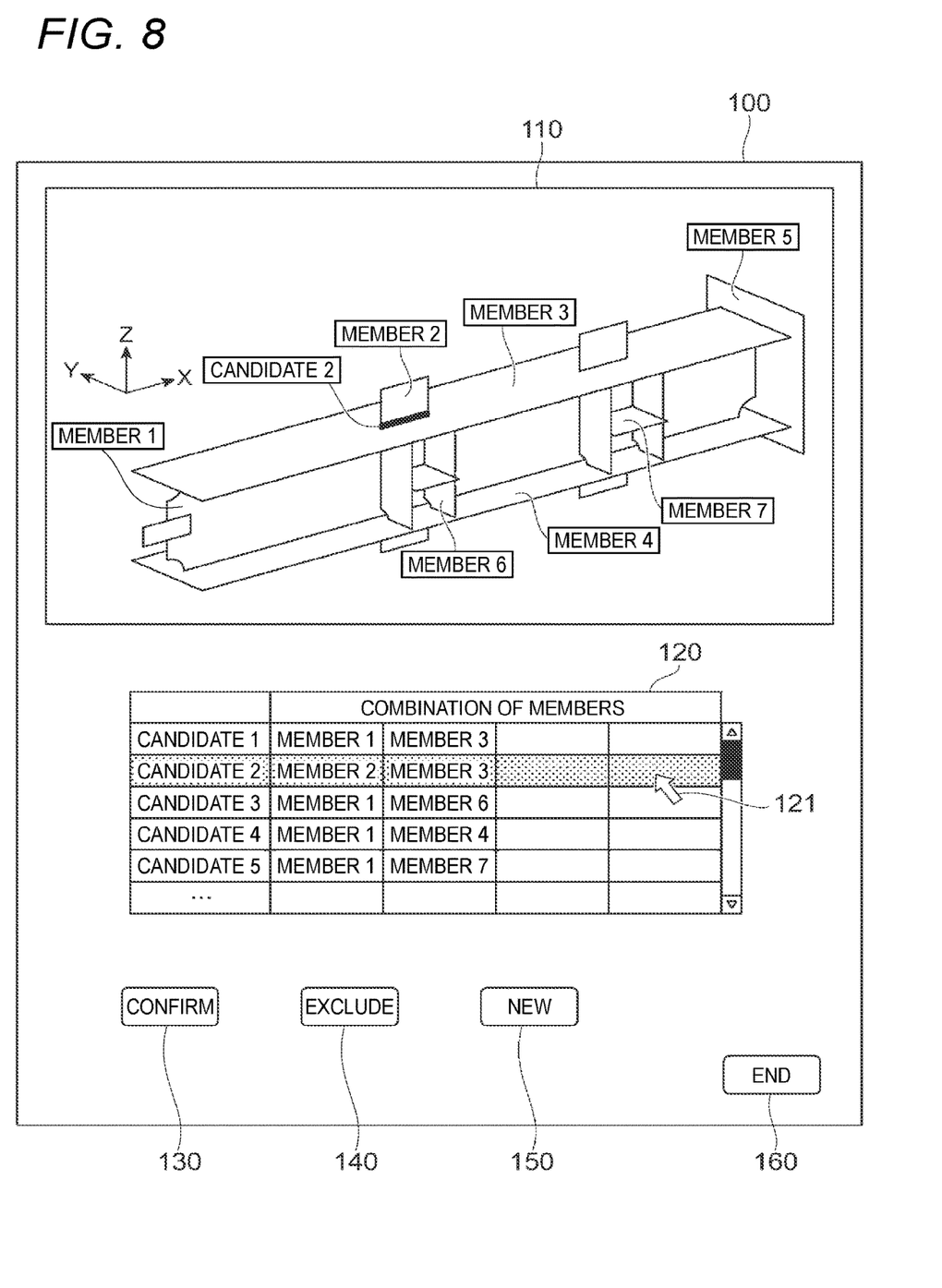
FIG. 8 is a diagram showing an example of a screen for receiving correction of a candidate of a weld line.

FIG. 8 is a diagram showing an example of a screen 100 for receiving correction of the candidate of the weld line that can be used in step S10 in FIG. 7.

The screen 100 shown in FIG. 8 includes a confirmation screen 110 that displays a three-dimensional model corresponding to the structure, a candidate column 120 in which a list of candidates of the weld line is displayed, a confirmation button 130 that is operated when a candidate designated by a cursor 121 is confirmed as a weld line, an exclusion button 140 that is operated when a candidate designated by the cursor 121 is excluded from the weld line, a new button 150 that is used when a portion that is not included in a candidate is added as a weld line, and an end button 160 that is operated at the end of a correction operation.

The structure shown in FIG. 3 is displayed on the confirmation screen 110 shown in FIG. 8. In the confirmation screen 110 shown in FIG. 8, the configuration name specified by the weld line data generation device 30 is displayed with a lead line from the corresponding member.

On the confirmation screen 110, a part corresponding to the candidate designated by the cursor 121 is displayed so as to be understood by the operator. In an example in FIG. 8, a portion on the structure corresponding to a "candidate 2" designated by the cursor 121 is changed to a highlighted display. Here, for example, a display by a thick line, a display by high luminance, a display by a preset color, a display by a lead line, or a combination thereof may be used for the highlighted display.

When a part not included in the candidate is included in the weld line, the operator operates, for example, the new button 150 to generate a new record, and then designates a part to be added on the confirmation screen 110.

When a candidate of an automatically registered weld line is incorrect, the exclusion button 140 may be operated after specifying the incorrect candidate by the cursor 121.

When the end button 160 is operated, the weld line data generation device 30 proceeds to step 11, and outputs a set of candidates of corrected weld line as weld line data.

Other Embodiments

Although the embodiment of the present invention have been described above, the technical scope of the present invention is not limited to the scope described in the above embodiment. It is apparent from the description of the claims that various modifications or improvements added to the above-described embodiment are also included in the technical scope of the present invention.

For example, in the embodiment described above, information on presence or absence of a groove is used to specify a weld line or a portion to be a candidate of the weld line, but the information may be used to specify a configuration name of members constituting the structure.

In the embodiment described above, the weld line data generation unit 34 (see FIG. 1) can select whether to correct a registered candidate of the weld line, but the weld line data generation unit 34 does not have to have a function of selecting whether to correct. In this case, the portion specified by the weld line data generation unit 34 is used as the weld line as it is.

The present application is based on a Japanese Patent Application (Japanese Patent Application No. 2019-032635) filed on Feb. 26, 2019, and the content thereof is incorporated herein as reference.

REFERENCE SIGNS LIST

1 Welding system
10 Welding robot
20 Welding control device
30 Weld line data generation device
31 Possibility information recording unit
32 Configuration name specifying unit
33 Combination extraction unit
34 Weld line data generation unit
40 Structure database

The invention claimed is:

1. A weld line data generation device that generates weld line data specifying a portion to be welded by a welding robot, the weld line data generation device comprising:
a recording unit in which possibility information indicating possibility of welding by the welding robot is recorded for each combination of configuration names of members;
an extraction unit configured to extract a combination of two or more adjacent members from three-dimensional data of a structure to be manufactured by welding;
a generation unit configured to generate, when a combination of configuration names corresponding to the extracted combination of two or more members is weldable, the weld line data specifying a portion to be welded between the two or more members corresponding to the combination; and
a configuration name specifying unit configured to specify a configuration name of each member constituting the structure based on both or one of a shape of each member constituting the three-dimensional data and a positional relationship between members,
wherein the configuration name specifying unit calculates, as a positional relationship between the two extracted members, at least one value of an inclination angle, a rotation angle, and a twist angle of the other member with respect to the one member, and specifies the other member as a non-welded member when the calculated value is equal to or greater than a threshold value.

2. The weld line data generation device according to claim 1, wherein
the configuration name specifying unit specifies a member that does not require welding by the welding robot as a non-welded member, and,
when one of the extracted combination of members is the non-welded member, the generation unit excludes the combination from a welding target.

3. The weld line data generation device according to claim 1, wherein
the configuration name specifying unit specifies a configuration name of a member having a plate-like shape based on an area of a member constituting the three-dimensional data.

4. The weld line data generation device according to claim 1, wherein
information on the shape of the member includes information on a shape of a groove.

5. The weld line data generation device according to claim 1, wherein
the configuration name specifying unit specifies a configuration name of a member adjacent to another member whose configuration name is specified based on a positional relationship with the another member.

6. The weld line data generation device according to claim 1, wherein
when one member of the extracted combination of adjacent members is the non-welded member, the generation unit excludes the combination from the welding target.

7. The weld line data generation device according to claim 1, wherein
the configuration name specifying unit specifies the configuration name of each member constituting the structure using a learned model that has learned a relationship between the configuration name of the member and both or one of the shape of a member and the positional relationship between members.

8. The weld line data generation device according to claim 1, wherein
the generation unit further determines, when the two extracted members are weldable, whether there is a groove at a portion where the two members are adjacent to each other, and generates, in a case where there is a groove, the weld line data according to information on a shape of the groove.

9. A welding system, comprising:
a welding robot configured to weld members to each other;
a welding control device configured to control an operation of the welding robot based on weld line data; and
the weld line data generating device according to claim 1.

10. A weld line data generation method for generating weld line data specifying a portion to be welded by a welding robot, comprising:
a controller including circuitry, the circuitry configured to:
extract a combination of two or more adjacent members from three dimensional data of a structure to be manufactured by welding;
determine whether welding of a combination of configuration names corresponding to the extracted combination of two or more members is possible by referring to possibility information for each combination of configuration names prepared in advance;
generate when a combination of configuration names corresponding to the extracted combination of two or more members is weldable, the weld line data specifying a portion to be welded between the two or more members corresponding to the combination;
specify a configuration name of each member constituting the structure based on both or one of a shape of each member constituting the three-dimensional data and a positional relationship between members;
calculate as a positional relationship between the two extracted members, at least one value of an inclination angle, a rotation angle, and a twist angle of the other member with respect to the one member, and specifying the other member as a non-welded member when the calculated value is equal to or greater than a threshold value; and
welding the portion to be welded between the two or more members.

11. A non-transitory computer readable medium storing a program for causing a computer to execute:
a process of extracting a combination of two or more adjacent members from three-dimensional data of a structure to be manufactured by welding;
a process of determining whether welding of a combination of configuration names corresponding to the extracted combination of two or more members is possible by referring to possibility information for each combination of configuration names prepared in advance; and
a process of generating, when a combination of configuration names corresponding to the extracted combination of two or more members is weldable, the weld line data specifying a portion to be welded between the two or more members corresponding to the combination;
a process of specifying a configuration name of each member constituting the structure based on both or one of a shape of each member constituting the three-dimensional data and a positional relationship between members; and
a process of calculating, as a positional relationship between the two extracted members, at least one value of an inclination angle, a rotation angle, and a twist angle of the other member with respect to the one member, and specifying the other member as a non-welded member when the calculated value is equal to or greater than a threshold value.

12. The weld line data generation device according to claim 3, wherein
the configuration name specifying unit specifies a configuration name of a member having a plate-like shape based on an area of a member constituting the three-dimensional data.

* * * * *